(12) United States Patent
Lidster et al.

(10) Patent No.: US 10,526,129 B2
(45) Date of Patent: Jan. 7, 2020

(54) LIDS FOR MODIFIED ATMOSPHERE PACKAGING CARTONS

(71) Applicant: iFood Packaging Systems Limited, Dublin (IE)

(72) Inventors: Perry David Lidster, Summerland (CA); Andrew Jared David Lidster, West Kelowna (CA)

(*) Notice: Subject to any disclaimer, the term of this patent is extended or adjusted under 35 U.S.C. 154(b) by 300 days.

(21) Appl. No.: 15/507,145

(22) PCT Filed: Aug. 25, 2015

(86) PCT No.: PCT/IB2015/056440
§ 371 (c)(1),
(2) Date: Feb. 27, 2017

(87) PCT Pub. No.: WO2016/030824
PCT Pub. Date: Mar. 3, 2016

(65) Prior Publication Data
US 2017/0275078 A1    Sep. 28, 2017

Related U.S. Application Data

(60) Provisional application No. 62/042,130, filed on Aug. 26, 2014.

(51) Int. Cl.
| | |
|---|---|
| *B65D 81/28* | (2006.01) |
| *B65D 81/20* | (2006.01) |
| *B65D 85/34* | (2006.01) |
| *B65D 51/28* | (2006.01) |
| *A23L 3/3436* | (2006.01) |
| *A23B 7/152* | (2006.01) |

(52) U.S. Cl.
CPC .............. *B65D 81/28* (2013.01); *A23B 7/152* (2013.01); *A23L 3/3436* (2013.01); *B65D 51/28* (2013.01); *B65D 81/2076* (2013.01); *B65D 85/34* (2013.01)

(58) Field of Classification Search
CPC ........ B65D 81/28; B65D 51/28; B65D 85/34; A23B 7/148; A23B 7/152
USPC .............................................. 206/204, 524.1
See application file for complete search history.

(56) References Cited

U.S. PATENT DOCUMENTS 4,844,263 A * 7/1989 Hadtke ................ B65D 21/022
206/508
6,102,198 A * 8/2000 Merrell ................ B65D 81/268
206/204

(Continued)

FOREIGN PATENT DOCUMENTS

EP    0330024    8/1989

*Primary Examiner* — King M Chu
(74) *Attorney, Agent, or Firm* — Morriss O'Bryant Compagni Cannon, PLLC

(57) ABSTRACT

A modified atmosphere packaging (MAP) lid (100) is provided. The lid includes a base (102); a sachet receiving surface (106) having a plurality of holes (110); and a raised perimeter wall (108) enclosing and defining the sachet receiving surface, wherein the sachet receiving surface lies level with or above the base. Also provided is a MAP container (150) including a MAP lid described herein, a dry chemical sachet (170) for placement on the sachet receiving surface; an adhesive patch (180) for sealing onto the raised perimeter wall to retain the dry chemical sachet on the sachet receiving surface; and a MAP carton.

26 Claims, 12 Drawing Sheets

(56) References Cited

U.S. PATENT DOCUMENTS

| | | | | |
|---|---|---|---|---|
| 2007/0012696 A1* | 1/2007 | Levie | .................. | B65D 21/086 220/8 |
| 2008/0116098 A1* | 5/2008 | Marooflan | ............... | B65D 1/36 206/503 |
| 2014/0116900 A1* | 5/2014 | Machado | ............... | B65D 81/28 206/205 |

* cited by examiner

LIDS FOR MODIFIED ATMOSPHERE PACKAGING CARTONS

CROSS-REFERENCE TO RELATED APPLICATIONS

This application is a national phase entry under 35 U.S.C. § 371 of PCT/IB2015/056440 filed on Aug. 25, 2015, which claims priority to U.S. Provisional Patent Application No. 62/042,130 filed on Aug. 26, 2014, the entirety of each of which is incorporated by this reference.

TECHNICAL FIELD

This invention relates to lids for modified atmosphere packaging (MAP) cartons.

BACKGROUND

The quality attributes of fresh fruits, vegetables, cut flowers, and other perishable agricultural commodities must be maintained as much as possible for as long as possible to ensure consumer acceptability. Quality deterioration of perishable goods comes about through plant tissue enzyme reactions including respiration, ripening and senescence, through microbial growth and through water loss from the tissue. Methods of inhibiting deteriorative enzyme reactions and growth of yeasts, molds and bacteria involve the maintenance of optimal conditions within the packaging of the perishable goods.

Modified atmosphere packaging (MAP) inhibits deterioration of perishable horticultural and agricultural commodities. MAP technology includes stackable containers that comprising a lid and a carton. US patent publication no. 2014/0116900, incorporated by reference herein in its entirety, discloses a lid with a covered recess for retaining dry chemical sachets that release of beneficial agents into the carton. Further improvements in the design of such lids are desirable.

SUMMARY

The inventions described herein have many aspects, some of which relate to modified atmosphere packaging (MAP) lids and MAP containers comprising such lids.

In one aspect, a modified atmosphere packaging (MAP) lid is provided. The lid comprises a base; a sachet receiving surface comprising a plurality of holes; and a raised perimeter wall enclosing and defining the sachet receiving surface, wherein the sachet receiving surface lies level with or above the base.

The plurality of holes may be spaced apart from each other by a distance equal to at least two, three, four, five or ten times a diameter of each of the holes.

The sachet receiving surface may comprise an outer region defined as an imaginary border region of constant width consisting of half of the surface area of the sachet receiving surface, wherein at least 80%, 85%, 90% or 100% of the plurality of holes are distributed in the outer region.

The total combined area of the plurality of holes may be less than 2 percent, 1 percent, or 0.5 percent of a total surface area of the sachet receiving surface.

The MAP lid may comprise more than one sachet receiving surface and more than one raised perimeter wall.

The sachet receiving surface may be rectangular and may be planar.

The sachet receiving surface may be concave, wherein a lowermost point of the sachet receiving surface lies level with or above the base.

The MAP lid may comprise raised corner portions. For example, the MAP lid may be rectangular and comprise four raised corner portions. The raised corner portions may range in height from ¼" to ⅝".

Opposing mid-regions of the MAP lid may comprise raised air flow guides configured to divert at least some incoming air away from a center of the MAP lid. The height of the raised air flow guides may be the same as any raised air corner portions.

The MAP lid may be made of a polymer material selected from the group consisting of ethylene vinylacetate (EVA), ethylbutyl acetate (EBA), a crosslinked ionomer resin, cast polyester (PET), a polyamide and polycarbonate (PC). The base, the sachet receiving surface, the raised perimeter wall, and any raised corner portions and any raised air flow guides of the MAP lid may be integrally thermoformed from the polymer material.

In another aspect, a modified atmosphere packaging (MAP) container is provided. The MAP container comprises a MAP lid as described herein, a dry chemical sachet for placement on the sachet receiving surface; an adhesive patch for sealing onto the raised perimeter wall to retain the dry chemical sachet on the sachet receiving surface; and a MAP carton.

The dry chemical sachet may comprise a releasable agent selected from the group consisting of an insecticide (sulfur dioxide), a preservative (oxygen absorber such as iron carbonate), an anti-microbial (chlorine dioxide), a ripening agent (ethylene), carbon dioxide, and nitrogen.

The foregoing discussion merely summarizes certain aspects of the inventions and is not intended, nor should it be construed, as limiting the inventions in any way.

BRIEF DESCRIPTION OF DRAWINGS

In drawings which show non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the description and drawings are to be regarded in an illustrative, rather than a restrictive, sense.

Directional conventions are employed in this specification to help clarify their meaning, as follows:
- the term "horizontal" and similar words as used herein are defined as a plane parallel to the base of the MAP lid;
- the term "vertical" and similar words as used herein refer to a direction perpendicular to the horizontal, as just defined;
- the terms "higher" and similar words as used herein refer to a position or orientation relatively closer to a point above the MAP lid;
- the term "lower" and similar words as used herein refer to a position or orientation relatively closer to a point below the MAP lid;
- the term "inner" and similar words as used herein refer to a position or orientation relatively closer to the middle of the MAP lid;
- the term "outer" and similar words used herein refer to a position or orientation relatively further away from the middle of the MAP lid;

FIGS. 1 to 5 and 8 show a MAP lid 100 according to an embodiment. MAP lid 100 is rectangular. In other embodiments, MAP lid 100 may be square, oval, triangular, or any other shape that matches the shape of its corresponding carton. MAP lid 100 may for example be thermoformed from a polymer material. Exemplary polymer materials include ethylene vinylacetate (EVA), ethylbutyl acetate (EBA), a crosslinked ionomer resin, cast polyester (PET), polyamide or polycarbonate (PC).

MAP lid 100 includes a base 102 and raised corner portions 104 at each corner. Base 102 is generally planar. Raised corner portions 104 each extend vertically from base 102 by a height H. In some embodiments, height H may be ¼" to ⅝", which is shorter than the ¾" height of raise corner portions of MAP lids of conventional MAP containers. Because the height of the raised corner relates directly to the overall height of vertically stacked MAP containers, the shorter raised corner portions 104 of the invention permit a greater number of MAP containers to be vertically stacked on a pallet. The present inventors have also determined that resulting narrower open space between stacked MAP containers results in greater air velocity between the MAP containers compared to that achieved with conventional MAP containers with lids having conventionally-sized raised corner portions. The present inventors have determined that this greater air velocity compensates for the narrower open space, resulting in a similar volume of air to pass between the MAP containers as compared to conventional MAP containers.

Figure 1:
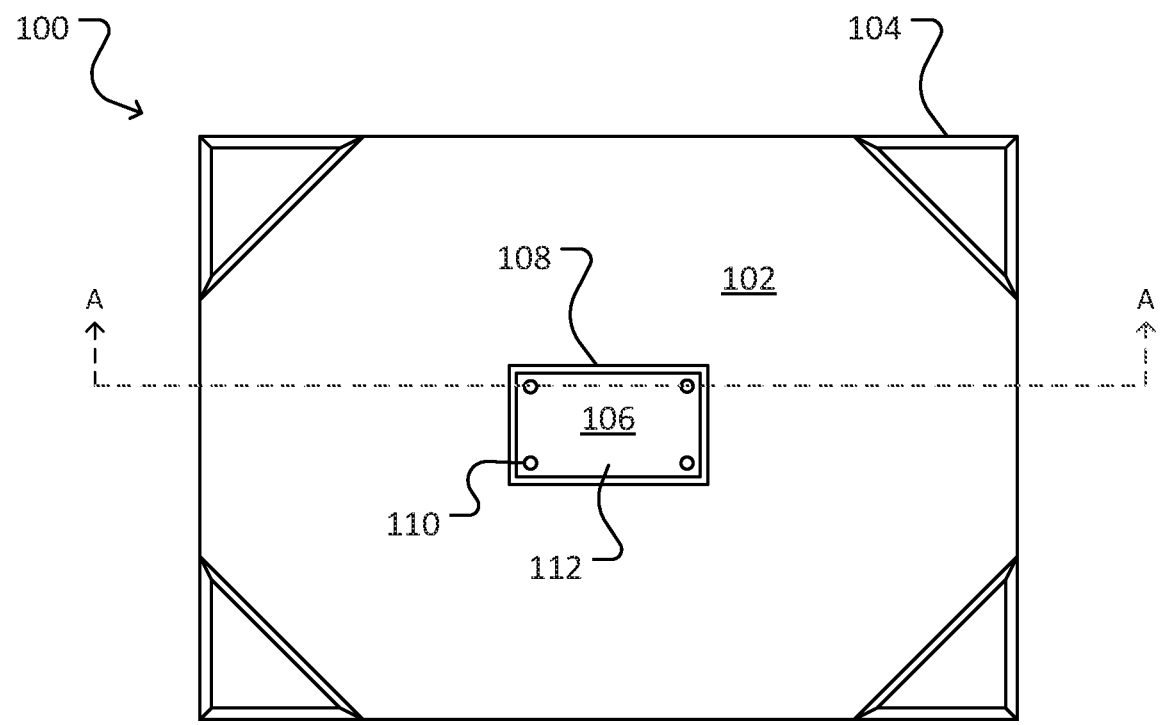
FIG. 1 is a top view of a MAP lid according to an embodiment of the invention.
Figure 2:
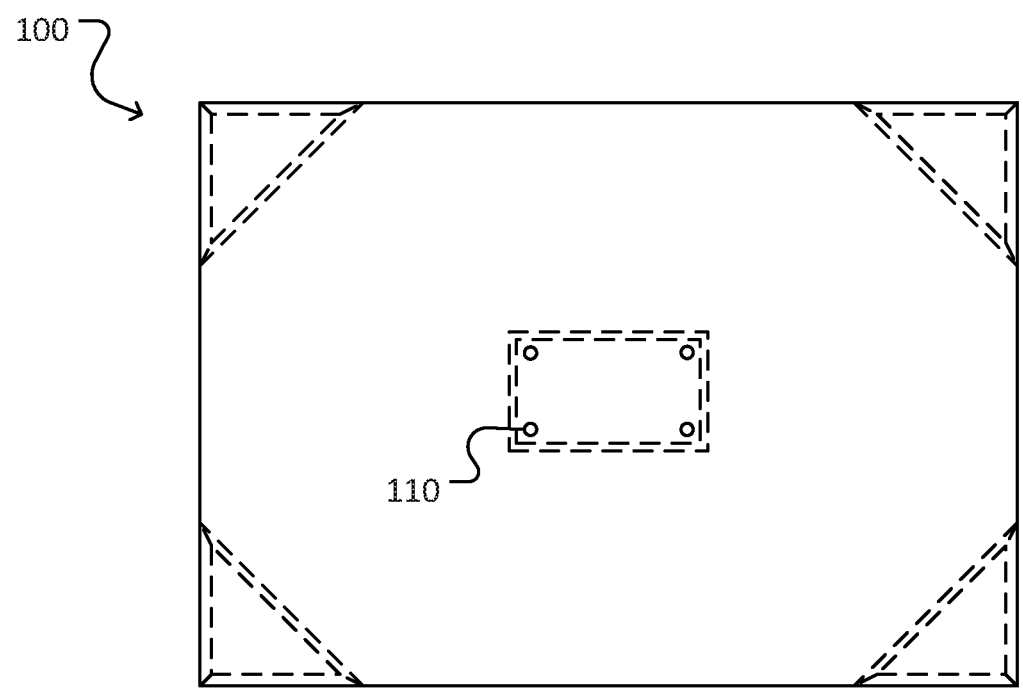
FIG. 2 is a bottom view of the MAP lid of FIG. 1.
Figure 3:
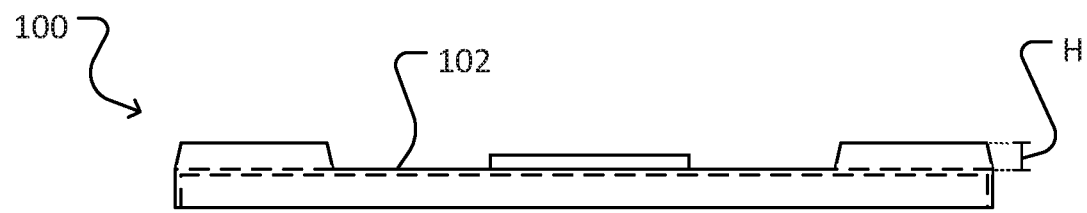
FIG. 3 is a side view of the MAP lid of FIG. 1.
Figure 4:
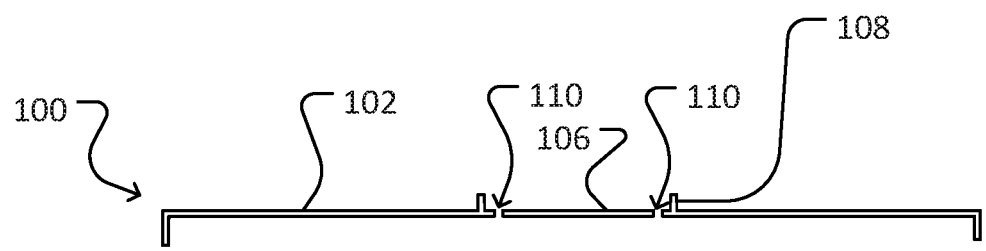
FIG. 4 is a cross-sectional side view of the MAP lid of FIG. 1 along section A-A.
Figure 6:
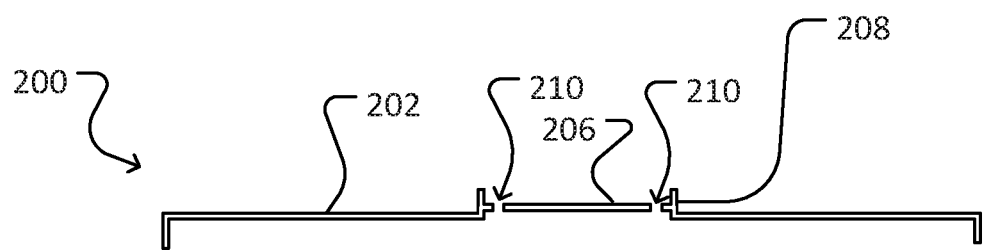
FIG. 6 is a cross-sectional side view of a MAP lid according to another embodiment of the invention, along a section similar to section A-A of FIG. 1.
Figure 7:
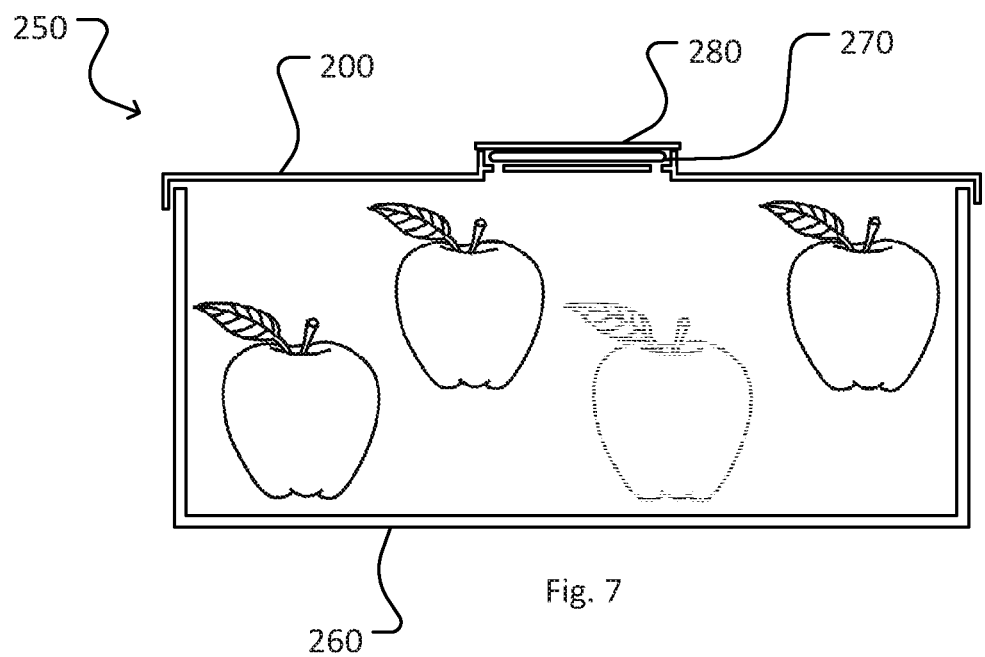
FIG. 7 is a cross-sectional side view of a MAP container comprising the MAP lid according to FIG. 6, along a section similar to section A-A of FIG. 1.

MAP lid 100 includes a sachet receiving surface 106 surrounded by a raised perimeter wall 108. As shown in FIG. 4, sachet receiving surface 106 lies level with the plane of base 102. In other embodiments, sachet receiving surface 106 may lie above the plane of base 102, as shown for example in FIG. 6 showing MAP lid 200. Features of MAP lid 200 are otherwise similar to correspondingly numbered features of MAP lid 100.

Sachet receiving surfaces of known MAP lids such as those disclosed in US patent publication no. 2014/0116900 are recessed within the base. In contrast, the present invention advantageously provides the sachet receiving surface at or above the level of the base so that (i) the volume of the container available to hold produce is maximized and (ii) the distance between the sachet and the produce is maximized to facilitate greater dispersion of releasable agents from the sachet prior to their contact with the produce.

Figure 5:
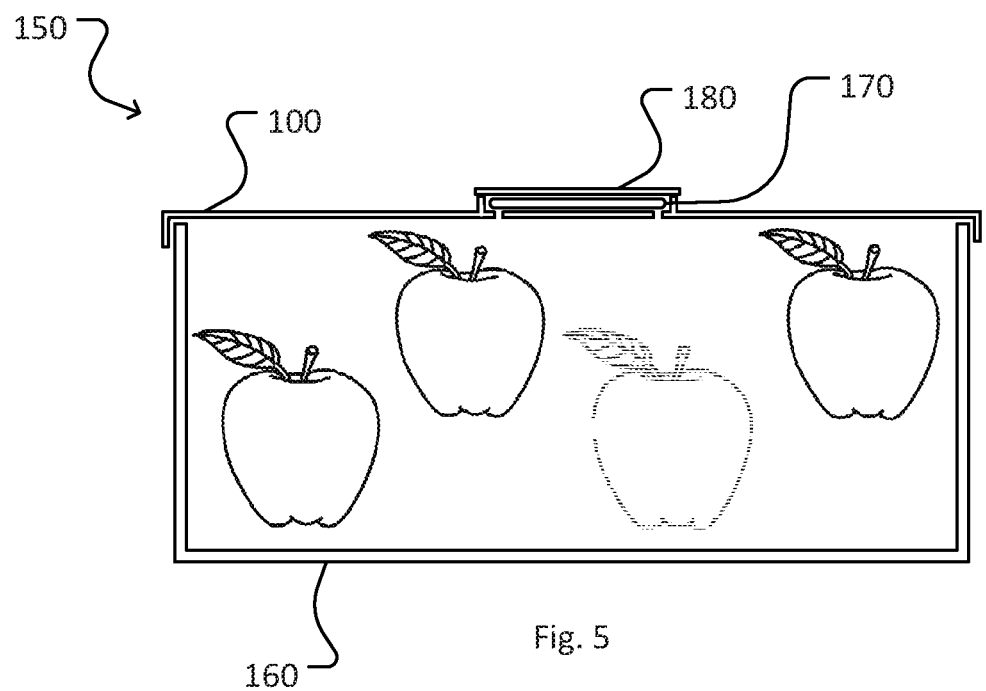
FIG. 5 is a cross-sectional side view of a MAP container comprising the MAP lid according to FIG. 1, along a section similar to section A-A of FIG. 1.

FIG. 5 shows a MAP container 150 including MAP lid 100, a MAP container 160, sachet 170, and an adhesive patch 180. MAP lid 100 is fitted onto MAP container 160. Sachet 170 is placed on sachet receiving surface 106 of MAP lid 100. Adhesive patch 180 is sealed onto raised perimeter wall 108 to retain sachet on sachet receiving surface 106. Sachet 170 may be a dry chemical sachet as described for example in US patent publication no. 2014/0116900. For example, sachet 170 may comprise a beneficial releasable agent such as an insecticide (sulfur dioxide), a preservative (oxygen absorber such as iron carbonate), an antimicrobial (chlorine dioxide), a ripening agent (ethylene), carbon dioxide, or nitrogen.

Sachet receiving surface 106 includes a plurality of holes 110 for allowing beneficial releasable agents from sachet 170 to pass into the MAP container. The present inventors have determined, however, that in conventional MAP lids as described for example in US patent publication no. 2014/0116900, produce can be damaged from overexposure to, and/or high concentrations of, releasable agents from the sachet. Certain embodiments of the invention therefore relate to MAP lids with a controlled location, spacing and/or size of holes 110 to control exposure of the produce to the sachet releasable agents.

In MAP lid 100, holes 110 are distributed along an outer region 112 of sachet receiving surface 106. Outer region 112 may be defined as an imaginary border region of constant width consisting of half of the surface area of sachet receiving surface 106. In MAP lid 100, 100% of holes 110 are disposed along outer region 112. In some embodiments, at least 95%, 90%, 85%, or 80% of the holes are disposed in the outer region. In other embodiments, holes 110 may be distributed evenly or randomly throughout sachet receiving surface 106.

Figure 8:
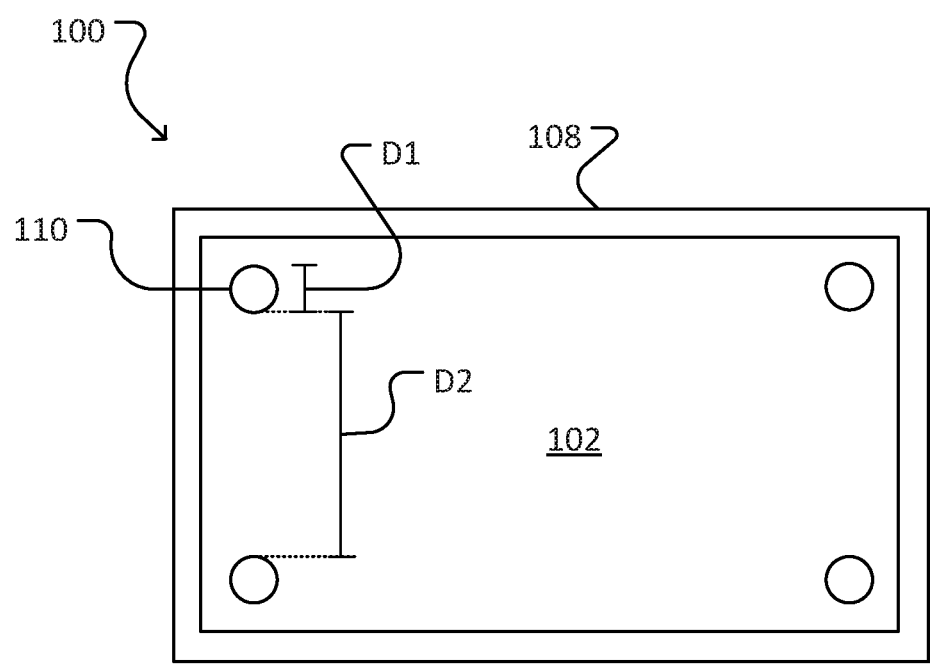
FIG. 8 is a partial top view of the MAP lid according to FIG. 1 showing the sachet-receiving surface.

As shown best in FIG. 8, holes 110 of MAP lid 100 are spaced apart such that the distance D2 between adjacent holes 110 is at least four times greater than the diameter D1 of each hole. In some embodiments, the distance D2 between adjacent holes may be at least two times, three times, five times, or ten times greater than the diameter D1 of each hole.

In MAP lid 100, the combined total area of holes 110 is less than 5 percent of the total surface area of sachet receiving surface 106. In some embodiments the holes may be less than 2 percent, 1 percent, or 0.5 percent of the total surface area of sachet receiving surface.

Figure 9:
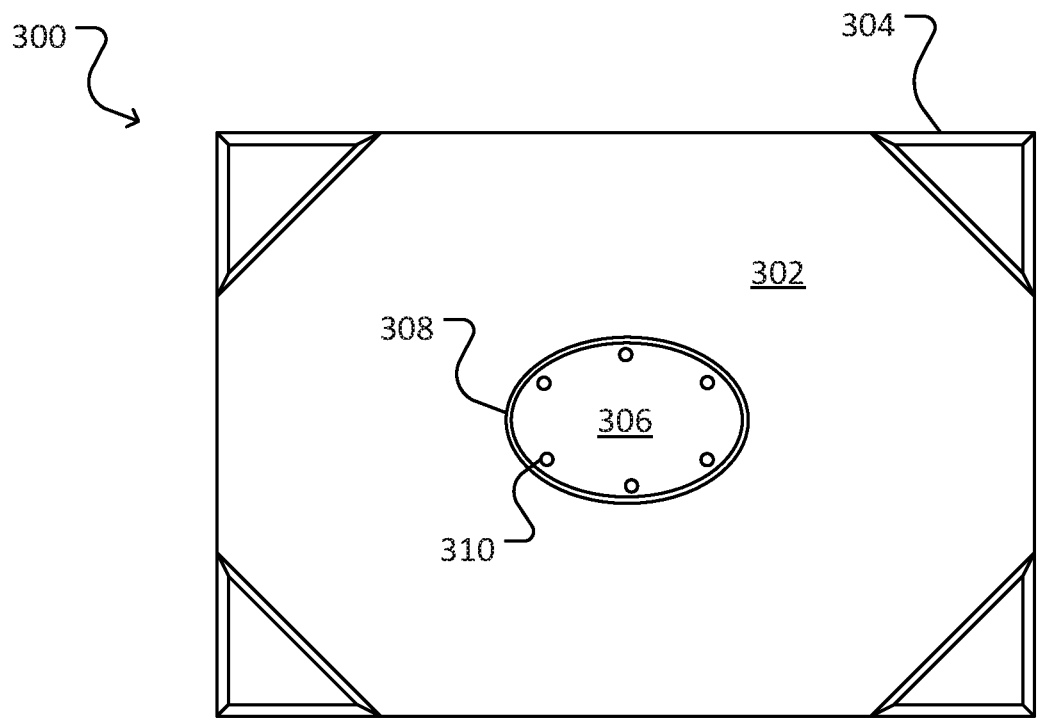
FIG. 9 is a top view of a MAP lid according to an embodiment of the invention.

FIG. 9 shows a MAP lid 300 according to another embodiment of the invention. Features of MAP lid 300 are similar to correspondingly numbered features of MAP lid 100. MAP lid 300 differs from MAP lid 100 in that sachet receiving surface 306, and therefore raised perimeter wall 308, are oval instead of rectangular.

Figure 10:
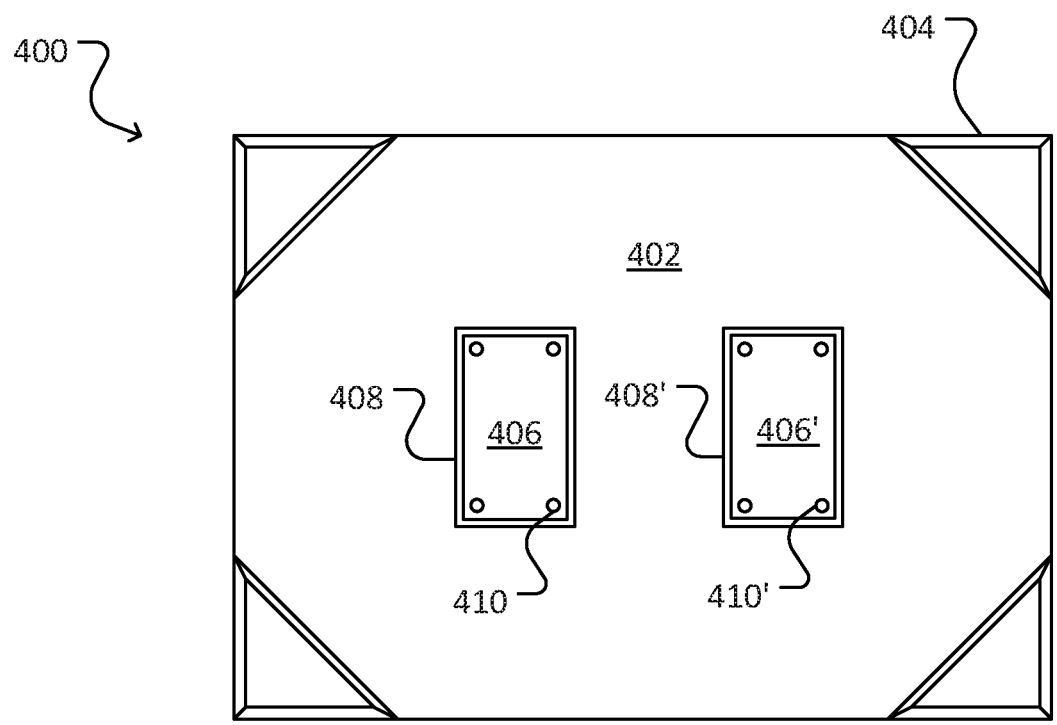
FIG. 10 is a top view of a MAP lid according to an embodiment of the invention.

FIG. 10 shows a MAP lid 400 according to another embodiment of the invention. Features of MAP lid 400 are similar to correspondingly numbered features of MAP lid 100. MAP lid 400 differs from MAP lid 100 in that MAP lid 400 has two sachet receiving surfaces 406, 406', and two corresponding raised perimeter walls 408, 408'. In still other embodiments, more than two sachet receiving surfaces and corresponding raised perimeter walls may be provided.

Figure 11:
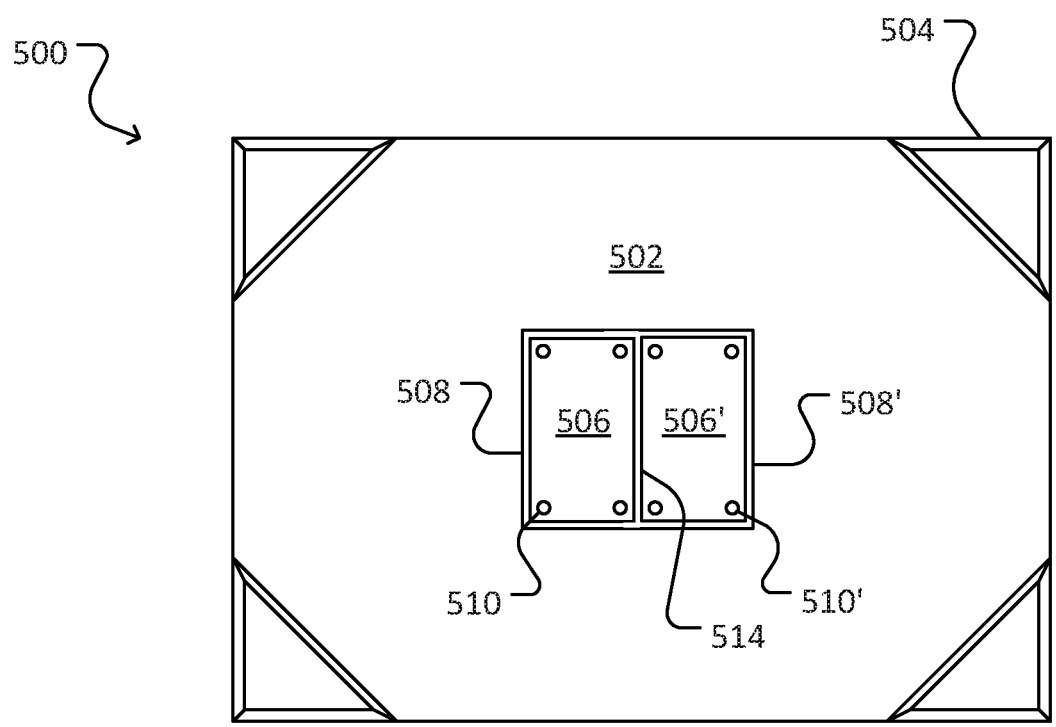
FIG. 11 is a top view of a MAP lid according to an embodiment of the invention.

FIG. 11 shows a MAP lid 500 according to another embodiment of the invention. Features of MAP lid 500 are similar to correspondingly numbered features of MAP lid 100. MAP lid 500 differs from MAP lid 100 in that MAP lid 500 has two adjacent sachet receiving surfaces 506, 506', separated and enclosed by two corresponding raised perimeter walls 508, 508' that share a common wall 514.

Figure 12:
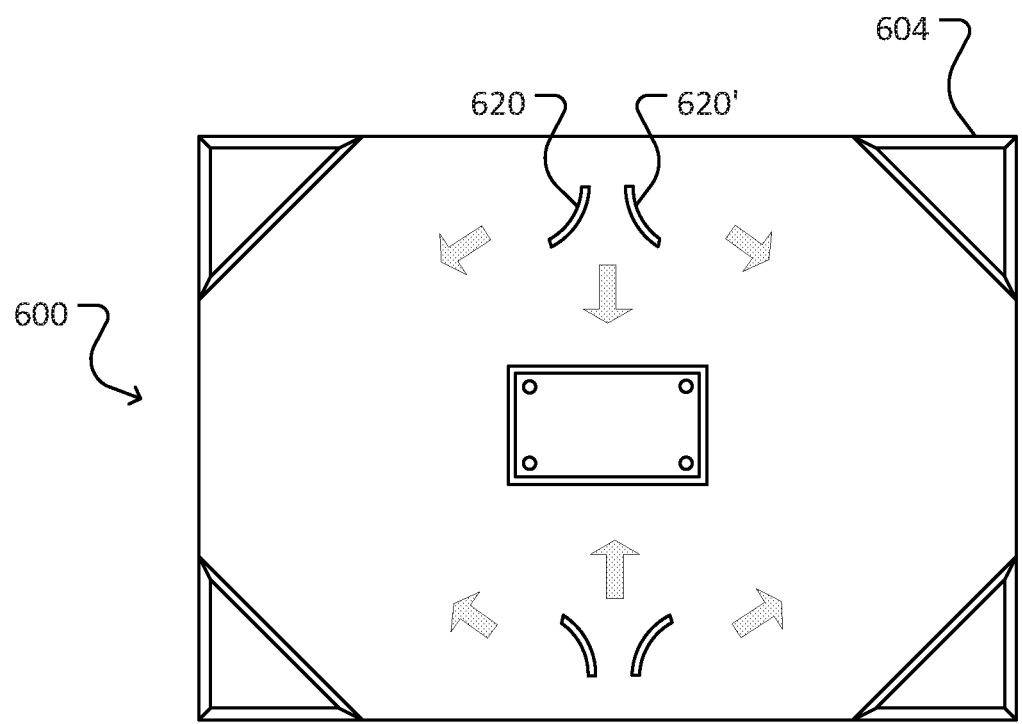
FIG. 12 is a top view of a MAP lid according to an embodiment of the invention.

FIG. 12 shows a MAP lid 600 according to another embodiment of the invention. MAP lid 600 is similar to MAP lid 100 but includes two pairs of air flow guides 620, 620' along mid portions of lid 600 between corner posts 604. In other embodiments, one pair or more than two pairs of air flow guides 620, 620' may be provided. For example, in some other embodiments four pairs of air flow guides 620, 620' may be provided, with a pair disposed along each mid portion of lid 600 between each corner posts 604.

Air flow guides 620, 620' divert at least some of the incoming air flowing across the top of MAP lid 600 away from the middle of MAP lid 600, as shown by the arrows in FIG. 12. Partial diversion of the incoming air flow provides for more even distribution of air flow between stacked MAP containers utilizing MAP lid 600. In some embodiments, air flow guides 620, 620' extend vertically to the same height as corner posts 604, thereby contacting and bearing some of the weight of the bottom of the MAP carton stacked above it, providing the additional stacking support to MAP containers utilizing MAP lid 600.

Figure 13:
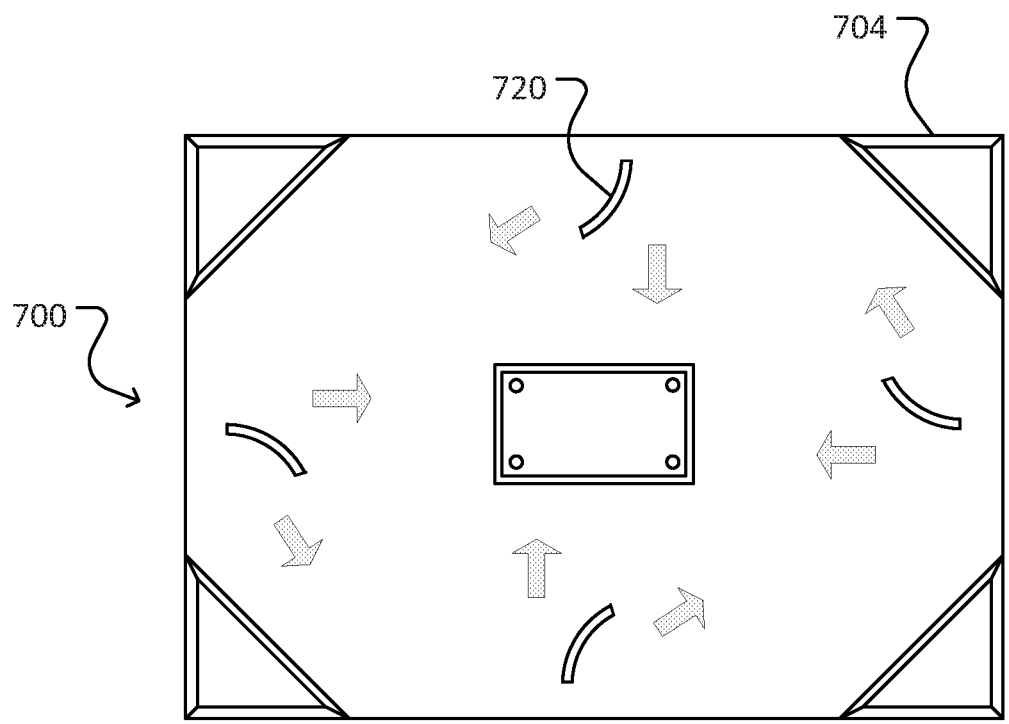
FIG. 13 is a top view of a MAP lid according to an embodiment of the invention.

FIG. 13 shows a MAP lid 700 according to another embodiment of the invention. MAP lid 700 is similar to MAP lid 600 but instead of two paired air flow guides provides four single air flow guides 720 along mid portions of lid 700 between corner posts 704.

In the embodiments shown, air flow guides 620, 620' and 720 are shown as curved elements. In other embodiments, the air flow guides may be linear, or any other shape suitable for facilitating at least partial diversion of air flow from the middle of the MAP lid. In some embodiments the air flow guides may be located along outer regions of the MAP lid, adjacent or abutting the side edges of the MAP lid. In other embodiments, the air flow guides may be located in a more inner region of the MAP lid.

Figure 14:
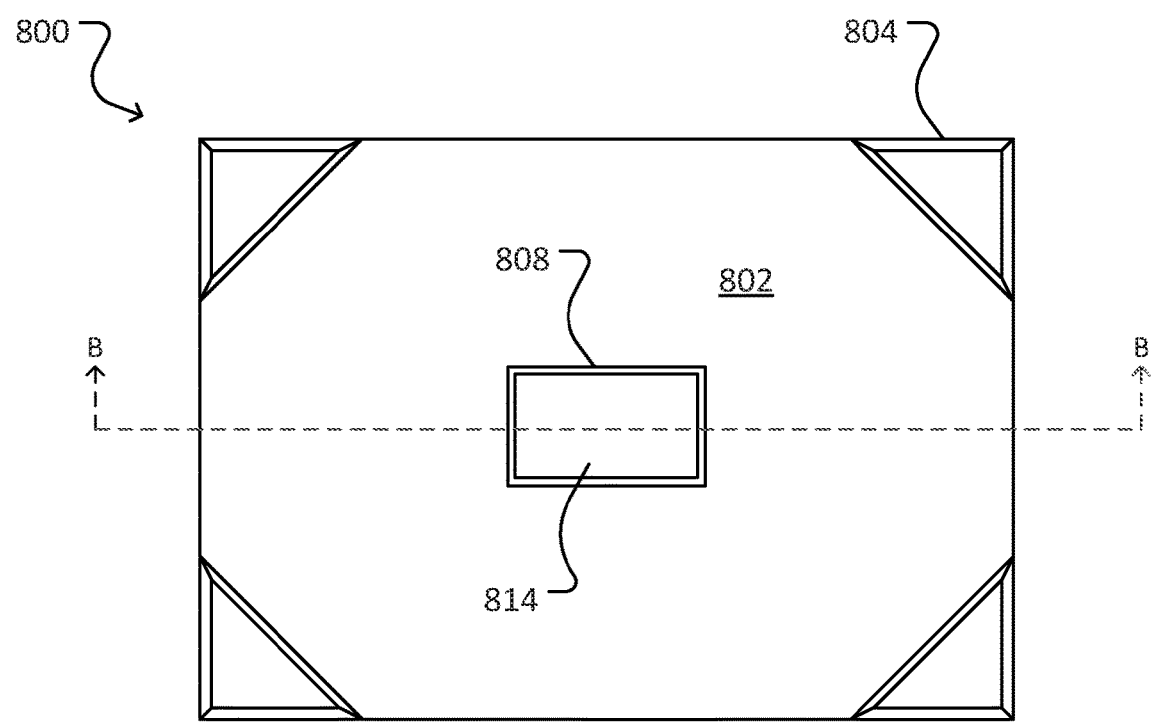
FIG. 14 is a top view of a MAP lid according to an embodiment of the invention.
Figure 15:
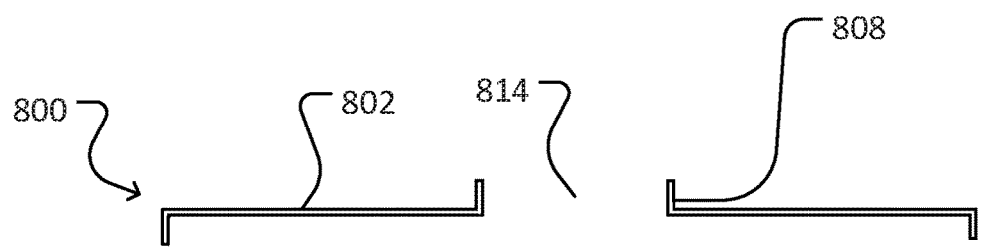
FIG. 15 is a cross-sectional side view of the MAP lid of FIG. 14 along section B-B.
Figure 16:
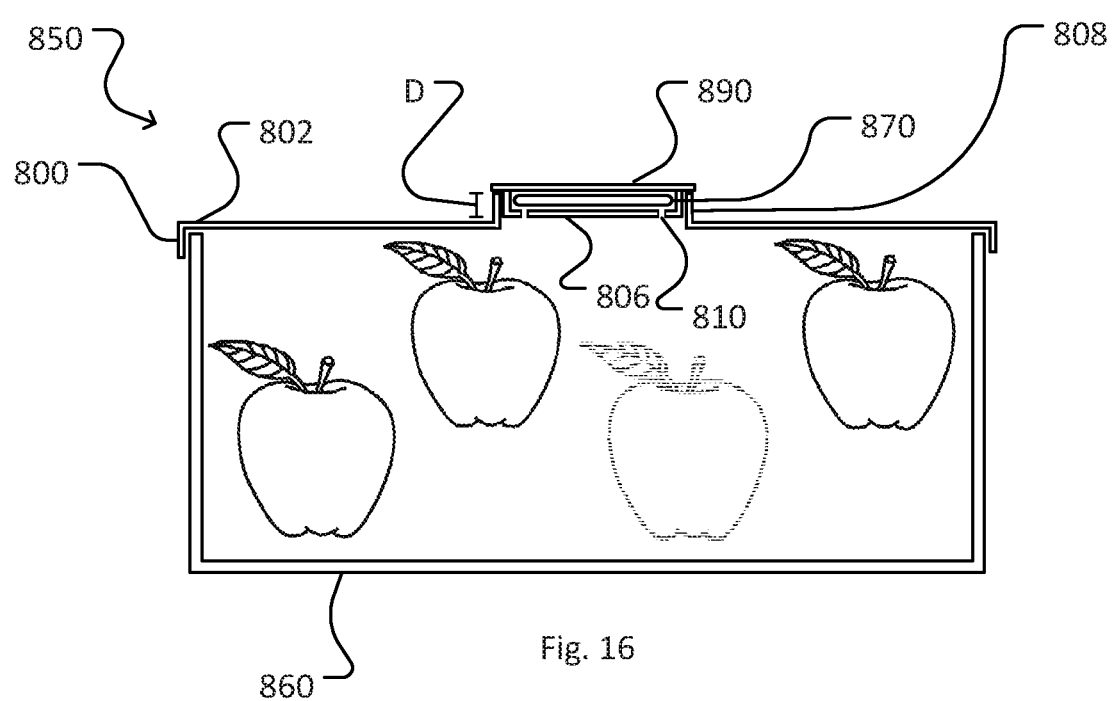
FIG. 16 is a cross-sectional side view of a MAP container comprising the MAP lid according to FIG. 14, along a section similar to section B-B of FIG. 15.

FIGS. 14 to 16 show a MAP lid 800 and MAP container 850 according to another embodiment of the invention. Features of MAP lid 800 and MAP container 850 are similar to correspondingly numbered features of MAP lid 100 and MAP container 150. MAP lid 800 differs from MAP lid 100 in that instead of a sachet receiving surface, MAP lid 800 has a hole 814 for receiving a sachet-containing insert 890. Sachet-containing insert 890 contains sachet 870. The depth D to which sachet-containing insert 890 suspends into hole 814 of MAP lid 800 is controlled such that the bottom 806 of sachet-containing insert 890 lies level with or above lid base 802. The depth may be controlled by predetermining the height of raised perimeter wall 808 and/or predetermining the thickness of sachet-containing insert 890. Bottom 806 of sachet-containing insert 890 includes holes 810 in a similar manner to holes 110 along sachet receiving surface 106 of MAP lid 100.

EXAMPLES

Figure 17:
FIG. 17 is a photograph of avocadoes in a MAP carton after treatment with a chlorine dioxide releasing sachet disposed in a known MAP lid.
Figure 19:
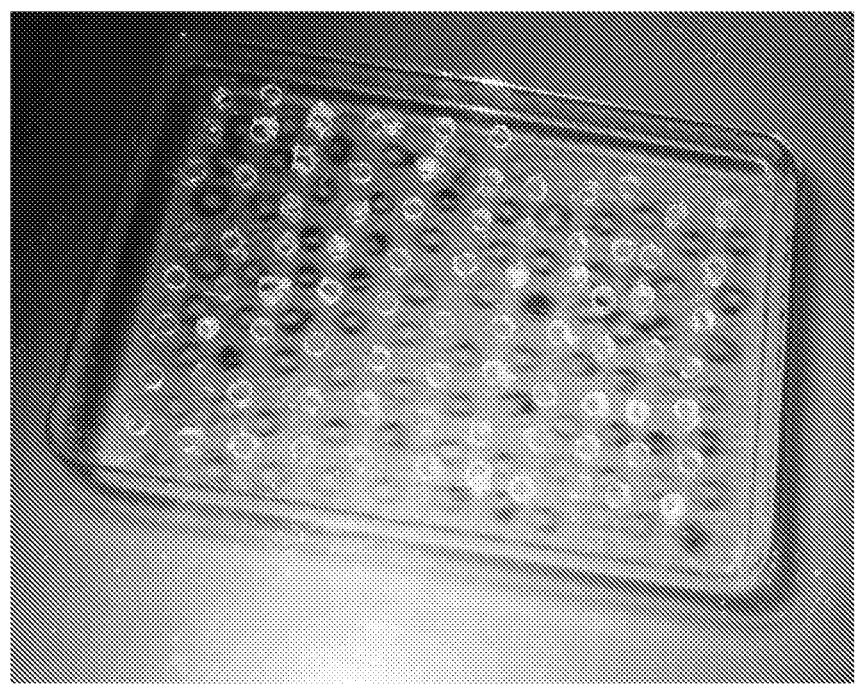
FIG. 19 is a photograph of a recessed sachet receiving surface of a known MAP lid.

In Experiment 1, avocadoes were placed in two MAP cartons. The first MAP carton was covered with a known MAP lid having a recessed sachet receiving surface with a plurality of holes distributed throughout the sachet receiving surface similar to the lids illustrated in US patent publication no. 2014/0116900. FIG. 19 shows the recessed sachet receiving surface of the known MAP lid. The second MAP carton was covered with a MAP lid according to an embodiment of the present invention, in particular a MAP lid having a sachet receiving surface level with the base of the MAP lid, and a hole located in the outer region adjacent each corner of the sachet receiving surface, the combined total area of the four holes not exceeding 2 percent of the total surface area of the sachet receiving surface. Dry chemical sachets containing 1 gram of chlorine dioxide were placed on the sachet receiving surfaces and sealed. FIG. 17 shows the condition of the avocadoes in the first MAP carton after 21 days. As evident from FIG. 17, the avocadoes located in the area corresponding to the area below and adjacent the sachet receiving surface of the known MAP lid suffered damage. None of the avocadoes in the second MAP carton after 21 days did not showed any damage.

Figure 18:
FIG. 18 is a photograph of pomegranates in a MAP carton after treatment with a chlorine dioxide releasing sachet disposed in a known MAP lid.

In Experiment 2, the protocol of Experiment 1 was followed except pomegranates were used in place of avocadoes. FIG. 18 shows the condition of the pomegranates in the first MAP carton after 21 days. As evident from FIG. 18, the pomegranates located in the area corresponding to the area below and adjacent the sachet receiving surface of the known MAP lid suffered damage. None of the pomegranates in the second MAP carton after 21 days did not showed any damage.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A modified atmosphere packaging (MAP) lid comprising:
    a base;
    a sachet receiving surface defining a plurality of holes; and
    a raised perimeter wall enclosing and defining the sachet receiving surface;
    wherein the sachet receiving surface is concave, and wherein a lowermost point of the sachet receiving surface lies level with or above the base.

2. The MAP lid according to claim 1 wherein the plurality of holes is spaced apart from each other by a distance equal to at least two, three, four, five or ten times a diameter of each of the holes.

3. The MAP lid according to claim 1 wherein the sachet receiving surface comprises an outer region consisting of half of the surface area of the sachet receiving surface, wherein at least 80%, 85%, 90% or 100% of the plurality of holes are distributed in the outer region.

4. The MAP lid according to any of claim 1 wherein a total combined area of the plurality of holes is less than 2 percent, 1 percent, or 0.5 percent of a total surface area of the sachet receiving surface.

5. The MAP lid according to any of claim 1 further comprising more than one sachet receiving surface and more than one raised perimeter wall.

6. The MAP lid according to claim 1 further comprising a plurality of raised corner portions.

7. The MAP lid according to claim 6 wherein the MAP lid is rectangular and comprises four raised corner portions.

8. The MAP lid according to claim 6 wherein the plurality of raised corner portions range in height from ¼ to ⅝".

9. The MAP lid according to claim 1 wherein opposing mid-regions of the MAP lid comprise a plurality of raised air flow guides configured to divert at least some incoming air away from a center of the MAP lid.

10. The MAP lid according to claim 9 wherein a height of the plurality of raised air flow guides is the same as any of the plurality of raised corner portions.

11. The MAP lid according to claim 1 wherein the MAP lid is made of a polymer material selected from the group consisting of ethylene vinylacetate (EVA), ethylbutyl acetate (EBA), a crosslinked ionomer resin, cast polyester (PET), a polyamide or polycarbonate (PC).

12. The MAP lid according to claim 1 further comprising a plurality of raised corner portions and a plurality of raised air flow guides, wherein the base, the sachet receiving surface, the raised perimeter wall, the plurality of raised corner portions and the plurality of raised air flow guides, are integrally thermoformed from a polymer material.

13. The MAP lid of claim 1, further comprising:
a dry chemical sachet for placement on the sachet receiving surface; and
an adhesive patch for sealing onto the raised perimeter wall to retain the dry chemical sachet on the sachet receiving surface.

14. The MAP lid of claim 13 wherein the dry chemical sachet comprises a releasable agent selected from the group consisting of an insecticide (sulfur dioxide), a preservative (oxygen absorber such as iron carbonate), an anti-microbial (chlorine dioxide), a ripening agent (ethylene), carbon dioxide, or nitrogen.

15. A modified atmosphere packaging (MAP) lid comprising:
a base;
a sachet receiving surface defining a plurality of holes; and
a raised perimeter wall enclosing and defining the sachet receiving surface;
wherein the sachet receiving surface lies level with or above the base;
wherein the MAP lid is rectangular and comprises four raised corner portions; and
wherein opposing mid-regions of the MAP lid comprise a plurality of raised air flow guides configured to divert at least some incoming air away from a center of the MAP lid.

16. The MAP lid according to claim 15, wherein the sachet receiving surface is concave, and wherein a lowermost point of the sachet receiving surface lies level with or above the base.

17. The MAP lid according to claim 15, wherein the plurality of raised corner portions range in height from ¼" to ⅝".

18. The MAP lid according to claim 15, wherein a height of the plurality of raised air flow guides is the same as any of the plurality of raised corner portions.

19. The MAP lid according to claim 15, wherein the MAP lid is made of a polymer material selected from the group consisting of ethylene vinylacetate (EVA), ethylbutyl acetate (EBA), a crosslinked ionomer resin, cast polyester (PET), a polyamide or polycarbonate (PC).

20. The MAP lid according to claim 15, wherein the base, the sachet receiving surface, the raised perimeter wall, and the plurality of raised corner portions and the plurality of raised air flow guides, are integrally thermoformed from a polymer material.

21. A modified atmosphere packaging (MAP) lid comprising:
a base;
a sachet receiving surface defining a plurality of holes;
a raised perimeter wall enclosing and defining the sachet receiving surface;
a plurality of raised corner portions; and
a plurality of raised air flow guides;
wherein the sachet receiving surface lies level with or above the base;
wherein the MAP lid is made of a polymer material selected from the group consisting of ethylene vinylacetate (EVA), ethylbutyl acetate (EBA), a crosslinked ionomer resin, cast polyester (PET), a polyamide or polycarbonate (PC); and
wherein the base, the sachet receiving surface, the raised perimeter wall, and the plurality of raised corner portions and the plurality of raised air flow guides, are integrally thermoformed from the polymer material.

22. The MAP lid according to claim 21, wherein the sachet receiving surface is concave, and wherein a lowermost point of the sachet receiving surface lies level with or above the base.

23. The MAP lid according to claim 21, wherein the plurality of raised corner portions range in height from ¼ to ⅝".

24. The MAP lid according to claim 21, wherein opposing mid-regions of the MAP lid comprise a plurality of raised air flow guides configured to divert at least some incoming air away from a center of the MAP lid.

25. The MAP lid according to claim 24, wherein a height of the plurality of raised air flow guides is the same as any of the plurality of raised corner portions.

26. The MAP lid according to claim 21, wherein the MAP lid is rectangular and comprises four raised corner portions.

* * * * *